Patented July 15, 1941

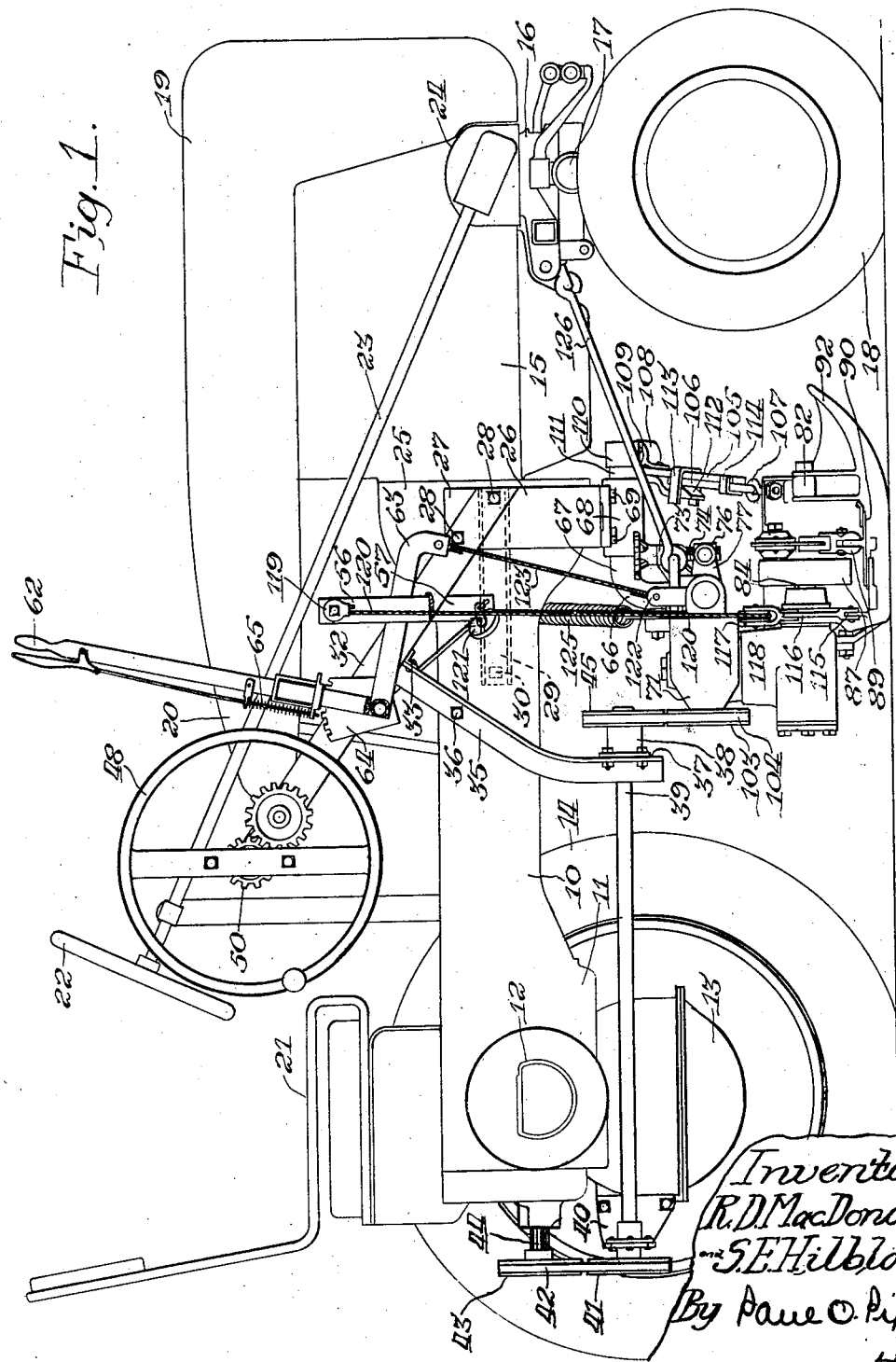

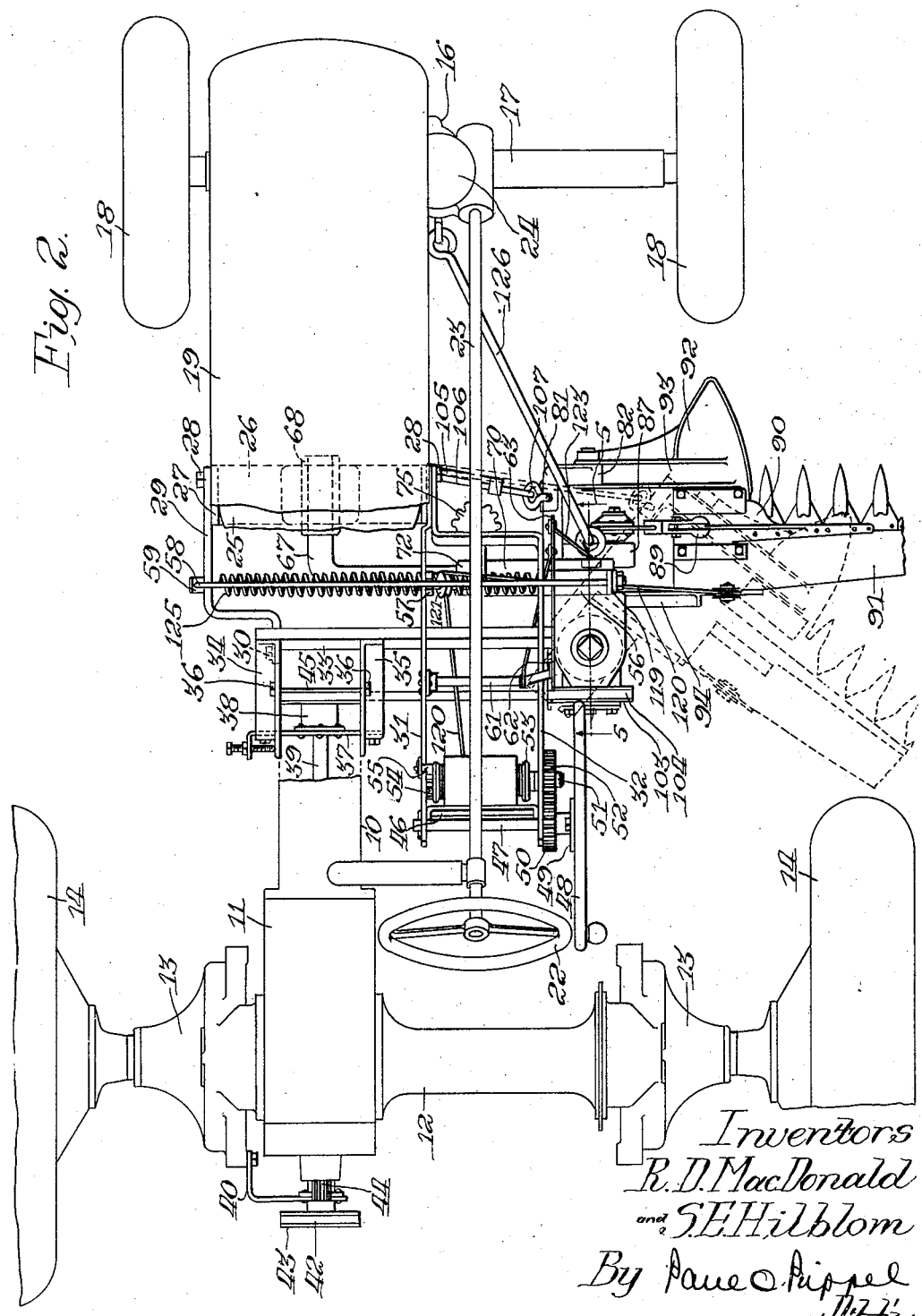

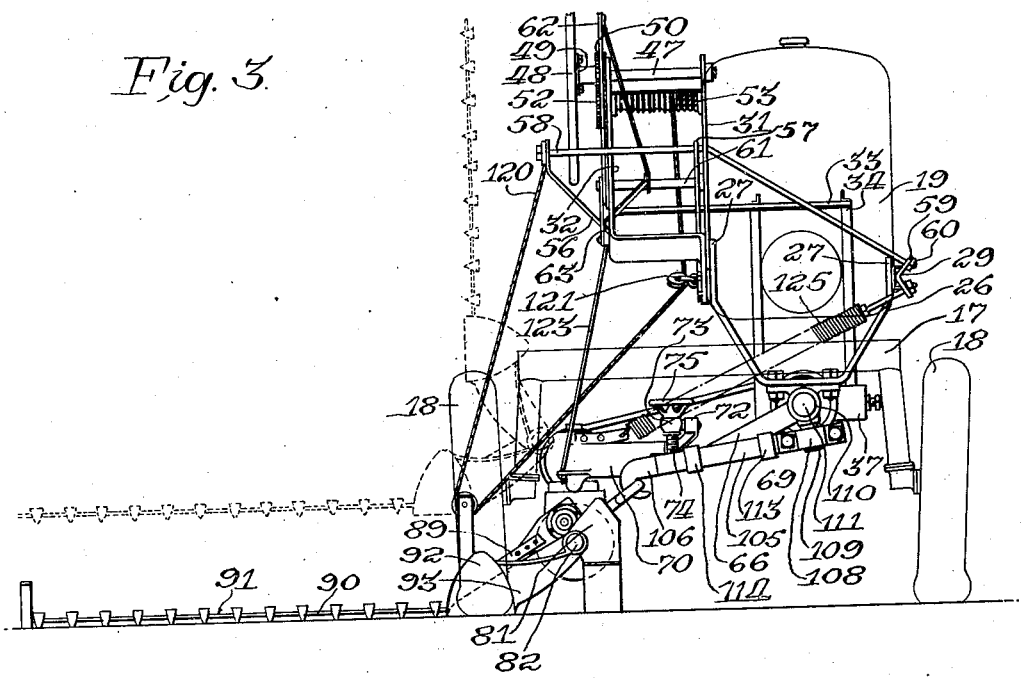
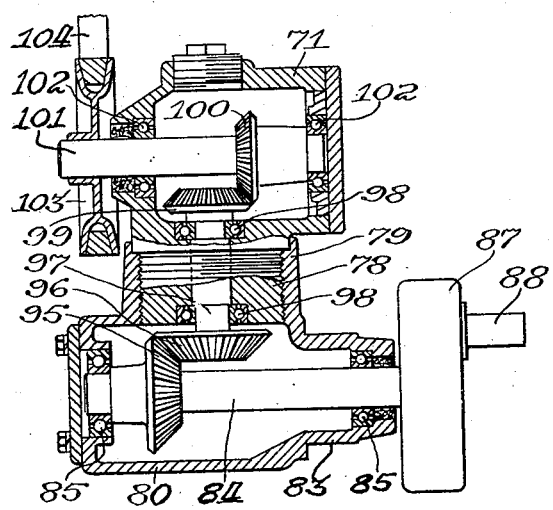
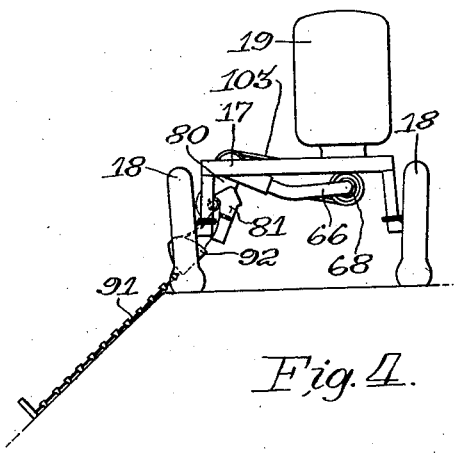
Inventors
R. D. MacDonald,
and S. E. Hilblom

2,249,633

UNITED STATES PATENT OFFICE 2,249,633

TRACTOR MOWER

Raymore D. MacDonald, Western Springs, and Samuel E. Hilblom, Chicago, Ill., assignors to International Harvester Company, a corporation of New Jersey Application May 16, 1940, Serial No. 335,436

18 Claims. (Cl. 56—25)

This invention relates to a tractor mounted and operated mower, and more particularly to a mower of that class in which the cutting mechanism is disposed at one side of the tractor intermediate the front and rear wheels of the tractor.

The invention contemplates especially, and has for its principal object, the provision of a tractor mower of the so-called highway type. In this type of tractor mower, the cutting mechanism is disposed at the side of the tractor as previously stated. The difficulties encountered in the operation of such mowers are considerably more acute than those presenting themselves to the operation of a mower of the ordinary type. This difference is due largely to the numerous obstacles encountered along the banks or shoulders of a highway. Certain other difficulties are presented by the varying ground contours at the edges of the highway. Accordingly, it is desirable that a mower be provided which has considerable flexibility and maneuverability, and which carries cutting mechanism adapted to be adjusted to accommodate varying ground contours. It is also desirable that the cutting mechanism be adapted to operate at varying heights, so that, for example, the tractor may be operated along the highway while the cutting mechanism extends laterally over curbing or the like.

An important object of the present invention is to provide a mower construction comprising a unitary frame which may be easily and readily mounted on a tractor.

Another important object is to provide an improved driving mechanism whereby the cutting mechanism continues to operate regardless of the position of the cutting mechanism.

Still another object is to provide a releasable connection for the cutting mechanism whereby the cutting mechanism may swing rearwardly upon striking an obstruction, thus preventing damage to the structural parts of the unit.

Briefly and specifically, these and other desirable objects are achieved in one preferred form of the invention wherein an improved mower construction is mounted on a tractor. The tractor includes a longitudinal main frame to which is detachably secured a unitary supporting frame structure which in turn carries the mower. The mower structure includes a laterally extending coupling bar pivotally carried by the supporting frame and pivotally carrying at its outer end a gear housing including pivot portions. The cutter-bar is pivotally carried for vertical movement on these pivot portions. The gear housing contains drive gearing including a shaft carrying a crank connected to the knife or sickle. The gearing is driven by a belt trained about a pulley which is in turn driven by the power take-off shaft of the tractor. The lifting mechanism comprises a cable and drum means connected to the cutter-bar. A second lifting means comprises a lever connected to the coupling bar. Either of the lifting means may be operated separately, thus enabling the cutter-bar to assume various positions with respect to ground contour.

A more complete understanding of these and other desirable objects and features of the invention may be had from the following detailed description taken in conjunction with the accompanying sheets of drawings, wherein:

Figure 1 is a side elevational view of a tractor mounted mower;

Figure 2 is a plan view of the same;

Figure 3 is a front elevational view on a slightly reduced scale;

Figure 4 is a schematic view showing the cutter-bar in downwardly inclined position; and, Figure 5 is a sectional view through the gear housing taken on the line 5—5 of Figure 2.

The tractor chosen for the purpose of illustrating the invention comprises a longitudinal main frame 10 consisting of a rearward frame part 11 having at opposite sides thereof laterally extending axle housings 12. Each housing has depending therefrom a final drive housing 13 carrying an axle connected to a drive wheel 14. The forward portion of the frame 10 is represented by the engine 15 which is appropriately carried by a supporting structure 16 on a front axle assembly 17 including laterally spaced front wheels 18. The body includes the usual radiator and hood structure 19 terminating at its rearward end in a fuel tank 20. The rearward portion of the frame carries the usual operator's station or seat 21, ahead of which is located a steering wheel 22 connected by a rod 23 to steering mechanism contained in a housing 24 located at the forward end of the tractor and operable to steer the front wheels 18.

The intermediate portion of the frame 10, constituting the forward portion of the rear frame part 11, is comparatively narrow and then enlarges to provide a bell housing 25; this housing is substantially circular in cross-section, and is adapted to have secured thereto the unitary mower frame structure.

This frame structure includes a U-shaped saddle member 26 having its opposite leg portions 27 secured by bolts 28 respectively to the opposite sides of the bell housing 26. The left side of the frame structure includes further a rearwardly extending support 29 bent inwardly toward the narrow portion of the frame part 11 and rigidly secured thereto by bolts 30. The right hand side of the frame includes a rearwardly and upwardly extending support or frame bar 31 paralleling the narrow portion of the frame or body part 11. A second support or bar 32 is spaced laterally from the bar 31 and is bent inwardly and then forwardly at its forward end and secured, with the bar 31, to the saddle portion 27. A transverse angle bar 33 is rigidly secured to the bars 31 and 32 and extends laterally across and above the body part 11, having its left-hand edge rigidly carried by a rearwardly and downwardly inclined angle bar 34; a substantially identical angle bar 35 is secured to the angle bar 33; the two bars 34 and 35 straddling the narrow portion of the body part 11 and depending below the body. The bars 34 and 35 are rigidly secured to the body part by bolts 36, and the lower ends of the bars have attached thereto a transverse plate member 37 carrying a bearing 38. The bearing 38 serves to journal the front end of a longitudinally extending drive shaft 39 having its rearward end carried in a bearing bracket 40 secured to the left-hand depending housing 13. The shaft 39 carries at its rearward end a drive pulley 41 having trained thereabout a drive belt 42 trained also about a pulley 43 carried on a shaft 44 extending from the rear of the tractor body and driven by the power of the tractor in the usual manner. The shaft 44 is the usual power take-off or may be any other equivalent source of power. The forward end of the shaft 39 carries for rotation therewith a drive pulley 45, the purpose of which will be described later.

As previously mentioned, the frame bars 31 and 32 extend upwardly and rearwardly. The upper ends of the bars are rigidly held in spaced relation by a transverse brace 46. A transverse shaft 47 is journaled in the upper ends of the bars 31 and 32. The outer end of the shaft 47 carries rigidly thereon a hand wheel 48 provided with a hub portion 49 including a pinion 50. A second shaft 51, paralleling the shaft 47 is journaled in the bars 31 and 32, and carries at one end thereof a gear or pinion 52 meshing with the pinion 50. The shaft further carries between the bars 31 and 32 a drum or spool 53. The inner end of the shaft carries a ratchet member 54 adapted to be engaged by a pawl 55. The structure just described comprises part of the lifting means for the cutting mechanism, a more detailed description of which will hereinafter appear.

The upwardly and rearwardly extending bar 32, at the right-hand side of the tractor, has rigidly secured thereto an outwardly and upwardly extending support or brace member 56. The corresponding inner bar 31 has rigidly secured thereto an upstanding bar 57, having its upper end portions substantially in transverse alinement with the upper end of the bar or the member 56 and its lower portion depending alongside the rear body part 11. A transverse stay rod 58 is rigidly secured at its right-hand end to the member or bar 56 and extends transversely across the frame structure to the opposite side of the tractor. This rod positively engages the upper end of the bar 57 and is then bent downwardly toward the left side of the tractor, where it is rigidly secured to a bracket member 59 rigidly carried by the rearwardly extending frame member or support 29. A nut 60 is threaded on the left-hand end of the rod 58 for the purpose of increasing the tension on the rod 58 to render the supporting frame structure more rigid.

The rearwardly and upwardly extending bars 31 and 32 have journaled intermediate their ends a transverse rock-shaft 61 extending at the right-hand side of the bar 31 and rigidly carrying thereon an upstanding lever 62 and a forwardly extending lift arm 63. A quadrant or sector 64 is carried by the member 32 and has teeth adapted to be engaged in the usual manner by locking mechanism 65 carried by the lever 62. The lifting arm 63 comprises part of the lifting means for the coupling bar, as will be hereinafter set forth.

The mower structure includes a laterally extending coupling bar 66 having its stubbleward end bent forwardly to provide a pivot portion 67 carried in a bearing or trunnion 68 rigidly secured to the under portion of the saddle or U-shaped supporting structure 26. The bearing 68 is secured to the part 26 by bolts 69 so that the parts may be readily assembled and disassembled. The outer end of the bar 66 fits into a sleeve 70 formed integral with a housing part 71. The sleeve 70 and housing 71 may have angular movement relative to the coupling bar 66. For the purpose of adjusting the angular position of the sleeve and housing, with respect to the bar 66, the bar carries rigidly thereon a bracket 72 pivotally carrying a sleeve 73 in which is threaded a rod 74 having at its upper end a hand wheel 75. As best shown in Figure 1, the lower end of the threaded member 74 is threaded into a trunnion block 76 carried by an ear 77 formed integral with the sleeve 70. Rotation of the hand wheel 75 results in angular movement of the sleeve 70 and housing 71 about the coupling bar 66.

As best shown in Figure 5, the housing 71 includes a depending threaded portion 78 which has threaded thereon the upstanding, internally threaded part 79 of a lower housing 80. The two housing parts are threaded loosely together so that relative angular movement is possible about a vertical axis extending through the parts 78 and 79. The housing part 80 includes a forwardly extending bracket portion 81 (Figures 1 and 2) having a forward portion terminating in a laterally extending bracket or bearing 82. The housing part 80 is further formed with an integral bearing portion 83 having its axis coaxial with the axis of the bearing part 82. A longitudinally extending shaft 84 is journaled at the opposite ends in bearings 85 within the lower housing part 80. This shaft lies along an axis coaxial with the common axis of the bearing parts 82 and 83. The shaft carries at its outer end a fly-wheel 87 carrying a crank pin 88 in turn connected to a pitman 89. The pitman is connected to a knife or sickle 90 carried for reciprocation in a laterally extending sickle or cutter-bar 91. The inner end of the cutter-bar 90 is provided with a shoe 92 having a pair of inwardly extending, integral arms 93 and 94. These arms are pivotally carried by the bearing parts 82 and 83 respectively and provide for mounting the cutter-bar 90 for vertical swinging movement about the axis of the bearing parts 82 and 83 and the shaft 84.

The shaft 84 carries within the housing 80 a bevel gear 95 meshing with a second bevel gear 96 carried on a vertical stub shaft 97 journaled in bearings 98 in the upper housing part 71. The shaft 97 has its axis coincident with the vertical axis about which the threaded portions 78 and 79 are formed. The upper end of the shaft 96 carries a bevel gear 99 meshing with a bevel gear 100 carried on a longitudinal shaft 101 journaled in bearings 102 in the upper housing part 71. The rearward end of the shaft 101 extends from the housing 71 and carries thereon a drive pulley 103 having trained thereabout a belt 104 which is in turn trained about the drive pulley 45 carried at the forward end of the drive shaft 39 previously referred to. In this manner power is supplied from the power take-off shaft 44 to the cutting mechanism comprising the reciprocating sickle 90.

Since the housing parts 71 and 80 are relatively movable about the vertical axis of the stub shaft 97 operation of the fly-wheel 87 is continued regardless of the angular position of the housing 80 with respect to the housing 71. Since the sickle bar 91 is carried, through the medium of the arms 93 and 94, by the housing 80, it is free to swing horizontally about the vertical pivot axis provided by the threaded portions 78 and 79 of the housings 71 and 80 respectively. Accordingly, operation of the sickle bar continues in any position of the cutter-bar in its plane of horizontal movement. The cutter-bar is thus mounted for pivotal movement rearwardly for the purpose of releasability when the bar strikes an obstruction. Means is provided for holding the cutter-bar normally in position extending laterally at the side of the tractor as shown in full lines in Figure 2. This means is releasable when the cutter-bar strikes an obstruction to permit rearward swinging movement thereof about the pivot axis in the housings 71 and 80, as shown in the broken line position in Figure 2. The releasable means comprises a pair of relatively slidable bars 105 and 106. The bar 106 is connected by an eye bolt 107 to the integral forward part 81 of the housing part 80. The inner end of the bar 105 is connected to a bracket 108 pivotally carried by a stud 109 included in a sleeve 110 carried by a forward portion 111 of the forwardly bent part 67 of the coupling bar 66. The inner end of the bar 105 further carries a resilient latch 112 engageable with the inner end of the bar 106. The bar 106 carries a U-shaped member 113 encircling the inner end of the bar 105. The bar 105 carries a U-shaped member 114 encircling the outer end of the bar 106. These two members serve to hold the bars 105 and 106 in position when connected and to guide the bars for relative sliding movement when the latch 112 is released by abnormal pressure on the cutter-bar 91. The particular type of release means shown and described forms no part of the present invention and has not, therefore, been more particularly set forth and described.

The mower shoe 82 is provided at an outer rear portion thereof with an integral ear 115 having pivoted thereto an upstanding arm 116 having a bifurcated end 117 carrying a guide or pulley 118. The upstanding member or bar 58, previously referred to as part of the supporting structure, rigidly carries a clamp member 119 securing one end of a cable 120. The cable passes downwardly and is trained about the pulley 118, passing then inwardly and upwardly where it is trained about a pulley 121 carried on the downwardly extending portion of the member 57 previously referred to. The cable is then wrapped around the drum 53, described above. Rotation of the hand wheel 48 operates the drum 53 to wind or unwind the cable 120 for the purpose of adjusting the position of and raising and lowering the cutter-bar 91.

The sleeve 70 of the upper housing 71 is provided with an upstanding ear 122 to which is connected the lower end of a flexible connection in the form of a cable 123 having its upper end connected to the forward end of the lifting arm 63. As previously set forth, this arm 63 is carried on the transverse rock-shaft 61 adapted to be rocked by the hand lever 62. Forward or rearward movement of the arm 63 results in a lowering or raising of the grassward end of the coupling bar 66. The sleeve 70 further carries a bracket 124 to which is connected the outer end of a tension spring 125 having its inner end adjustably carried by the member 39 previously referred to as secured to the rearwardly extending member 29 of the supporting frame structure. This spring serves as a helper or balancing spring in lifting and lowering the mower structure. A brace rod 126 is connected between the front of the tractor and the upper housing part 71.

In the operation of the device under ordinary circumstances the coupling bar and cutter-bar assume the positions shown in full lines in Figure 3. In this instance the mower shoe 82 rides the ground surface and the sickle 90 is operated to cut in the ordinary manner. In the event that the tractor is operated on the highway or under other circumstances where the vegetation at one side is at a level substantially higher than the level over which the tractor operates, the cutting mechanism may be raised to and operated in the first broken line position shown in Figure 3. The raising of the cutting mechanism is accomplished by rotation of the hand wheel 48, thus drawing the cable 120 through the sheaves or pulleys 118 and 121. The cutter bar is thus raised horizontally to the position shown. During this operation the coupling bar 66 will be also raised to some extent because of its connection to the cutter-bar, and because the position of the lifting connections are such as the cutter bar will move up generally parallel to the ground. The drum 53 may be maintained in position by means of the pawl and ratchet mechanism 55 previously described. The same position of the cutting mechanism may be utilized in operation under those circumstances where it is desired to cut the vegetation at substantial heights above the ground. This function is generally referred to as the high-cutting operation. As is shown in Figure 3 in the second broken line position, the cutter-bar may be raised absolutely vertical to a transport position. This position of the cutter-bar is also achieved by operation of the drum 53. It is not necessary here to operate the lifting means comprising the hand lever 62 and the lifting arm 63, for the cable 120 will suffice to hold the cutter-bar in transport position.

As shown schematically in Figure 4, the cutter-bar is adapted to operate along slopes or the like wherein a cutting angle is formed by the relative vertical positioning between the cutter-bar and the coupling bar. To attain the position illustrated here it is necessary that the winding drum 53 be operated to play out the cable 120 until the cutter-bar assumes the position shown. It may be necessary to operate the hand lever 62 to raise the end of the coupling bar, along with the parts attached thereto, to the position shown. It will be noted that the drive shaft 39 is disposed for rotation about an axis coaxial with the pivot axis of the coupling bar 66 about the bearing 68. This provision enables also any position to be assumed by the coupling bar without interference with the driving mechanism. Similarly, the pivot for the cutter-bar 91 on the housing 80 is located on the axis of the drive shaft 84 as described above. Thus, the cutter-bar may assume any position and the driving mechanism will continue to operate. In the event that the mower is to be operated along the edge of a highway or under other circumstances where the surface to be cut is at an upward angle with respect to the surface over which the tractor operates, the hand lever 62 may be operated to lower the outer end of the coupling bar 66 to a position adjacent the ground. The winding drum 53 is operated to raise the cutter-bar. Continued vertical movement of the outer end of the coupling bar accordingly disposes the pivot axis between the cutter-bar and the housing 80 at different vertical positions. Thus, the other end of the cutter-bar may be raised to a substantial height while the inner end is disposed in a position adjacent the ground. The mower is thus adapted to operate under conditions substantially the reverse of those illustrated in Figure 4. Various other heights and positions of the cutter-bar may be established by the combined use of the winding drum 53 and lever 62.

As previously described, the pivot axis between the housing parts 71 and 80 is coincident with the axis of the drive shaft 87. Accordingly, when the cutter-bar strikes an obstruction and swings rearwardly about the axis, the driving mechanism is not interrupted. This provision is concomitant to the provision in the releasable means or bars 105, 106, wherein the U-shaped members 113 and 114, in addition to serving as guides for the bars, serve also as stop means, whereby the bars are prevented from complete separation. Accordingly, the cutter-bar 91 has limited rearward swinging movement. When it is desired to reconnect the cutter-bar to the normal operating position, it is necessary merely to back the tractor. The cutter-bar accordingly swings forwardly relative to the tractor and the latch member 112 reengages with the bar 106. Since the driving mechanism continues to operate throughout the releasing of the cutter-bar, it is not necessary that any reconnection be made. The entire arrangement is such as to provide easy reconnection of the cutter-bar without necessitating the operator's dismounting from the tractor seat.

As set forth above, the frame structure comprising the parts designated by the characters 26 to 33 is substantially unitary. The structure may be thus removed as a unit from the tractor body 10. It will be noted that the supporting parts and complementary parts of the mower are connected directly to the frame structure independently of any connection to the tractor body. In this manner when it is desirable to remove the mower structure from the tractor, it is not necessary to disconnect a number of mower parts. The rearward support 40 for the drive shaft 39 is thus the only part of the mower drive mechanism that is connected to and that must be removed from the tractor in detaching the mower. The remainder of the structure may be readily removed and set aside while the tractor is being utilized for other purposes.

It will be noted that the connection of the cable 120 to the member 56 by the clamp 119 is substantially in vertical alinement with the pivot axis between the housing parts 71 and 80. The guide or pulley 118 is carried by the arm 116 on the shoe 92 in close proximity to this axis. This provision enables the cutter-bar to swing rearwardly without substantially interfering with the lifting cable 120; that is to say, the cable 120 does not retard such rearward swinging movement. Accordingly, it is not necessary that releasable means be provided in the lifting mechanism to compensate for changes in position of the cutter-bar as it swings rearwardly. The flexibility of the cable connection is also conducive to free movement of the cutter-bar when connected. The connection represented by the cable 123 between the ear 122 on the housing 71 and the forward end of the lifting arm 63 is similarly disposed with respect to the vertical pivot axis. Accordingly, the lifting means including the cable 123 does not interfere with the rearward swinging movement of the cutter-bar.

From the foregoing description it will be seen that the objects of the invention are admirably attained in the preferred form illustrated. Other objects and features will be apparent to those skilled in the art. It will be appreciated, of course, that but one form of the invention has been illustrated and described and that numerous modifications and alterations may be made therein without departing from the spirit and scope of the invention as defined in the appended claims.

What is claimed is:

1. In a tractor-mounted mower wherein the tractor includes a longitudinal body carried on front and rear wheels and having a power take-off means, the combination with the body of a unitary frame structure detachably carried by the body between the front and rear wheels of the tractor, a mower carried by said frame and including a coupling bar movably connected to the frame for vertical movement and extending at one side of the body, a housing carried by said bar, a second housing pivoted on the first housing on a vertical axis, a cutter-bar including a sickle pivotally carried by the second housing on a longitudinal axis, drive gearing arranged in said housings and including a shaft having its axis coincident with the aforesaid vertical axis, means operatively connecting the gearing and the power take-off means, means carried by the frame for lifting and lowering the coupling bar about its connection on the frame, and means carried by the frame for lifting and lowering the cutter-bar about its axis on the second housing.

2. In a tractor-mounted mower wherein the tractor includes a longitudinal body carried on front and rear wheels and having a power take-off means, the combination with the body of a unitary frame structure detachably carried by the body between the front and rear wheels of the tractor, a mower carried by said frame and including a coupling bar pivoted on the frame on a longitudinal axis for vertical movement and extending at one side of the body, a cutter-bar including a sickle pivotally carried by the coupling bar on a longitudinal axis, drive means operatively connecting the sickle and the power take-off means, means carried by the frame for lifting and lowering the coupling bar about its pivot axis on the frame, and means carried by the frame for lifting and lowering the cutter-bar about its axis on the coupling bar.

3. For a tractor having a longitudinal body carried on front and rear wheels, a mower structure comprising a unitary frame embracing and carried detachably by the body between the front and rear wheels, a mower carried by the frame and including a first part pivoted to the frame on a longitudinal axis and a second part pivoted on the first part of a longitudinal axis, said parts being movable vertically with respect to the tractor and to each other, lifting and lowering means carried by the frame independently of the body and connected to the first part, and lifting and lowering means carried by the frame independently of the body and connected to the second part.

4. For a tractor having a longitudinal body carried by front and rear wheels and having a rear power take-off shaft, a mower structure comprising a unitary frame detachably carried by the body between the front and rear wheels, a mower including cutting mechanism carried by the frame independently of the body, and driving means between the power take-off shaft and the cutting mechanism and including a drive member carried by the frame.

5. For a tractor having a longitudinal body carried on front and rear wheels and including an operator's station at its rear, a mower structure comprising a unitary frame detachably carried by the body forwardly of the operator's station and including a frame member extending rearwardly in proximity to the operator's station, a mower carried by the frame at one side of and independently of the body and including a cutter-bar hinged for vertical movement, and lifting and lowering means for the cutter-bar carried by the aforesaid member of the frame independently of the body and including a control member in the vicinity of the operator's station.

6. For a tractor having a longitudinal body carried by front and rear wheels and having a rear power take-off shaft, a mower structure comprising a unitary frame detachably carried by the body between the front and rear wheels, a mower including cutting mechanism carried on a longitudinal axis by the frame independently of the body for vertical movement, and driving means between the power take-off shaft and the cutting mechanism including a rotatable drive member carried by the frame on an axis substantially coaxial with the aforesaid axis.

7. In a tractor-mounted mower wherein the tractor includes a longitudinal body carried on front and rear wheels and having a power source, the combination with the body of a unitary frame detachably carried by the body between the front and rear wheels, a mower carried by the frame independently of the body for vertical movement with respect to the body from ground position to raised position and extending laterally at one side of the tractor, cutting mechanism for the mower, a drive member for the cutting mechanism carried by the frame independently of the body and connected to the tractor power source, and lifting and lowering means for the mower carried by the frame independently of the body.

8. In a tractor-mounted mower wherein the tractor includes a longitudinal body carried on front and rear wheels and having a power source, the combination with the body of a mower supported by the body between the front and rear wheels on a longitudinal axis for vertical movement from ground position to raised position and extending laterally at one side of the tractor, cutting mechanism for the mower, a rotatable drive member for the cutting mechanism carried by the body on an axis substantially coaxial with the mower support axis and connected to the tractor power source, and lifting and lowering means for the mower carried by the tractor body.

9. For a tractor having a longitudinal body carried on front and rear wheels and including a power source, a mower structure comprising a unitary frame embracing and detachably carried by the body between the front and rear wheels, a mower carried by the frame and including a first part pivoted to the frame on a longitudinal axis and a second part pivoted on the first part on a longitudinal axis, said parts being movable vertically with respect to the tractor and to each other, lifting and lowering means carried by the frame independently of the body and connected to the first part, lifting and lowering means carried by the frame independently of the body and connected to the second part, a rotatable drive member carried by the frame on an axis substantially coaxial with the first longitudinal axis and connected to the tractor power source, and a second rotatable drive member carried by the mower on an axis substantially coaxial with the second longitudinal axis and connected to the first drive member.

10. For a tractor having a longitudinal body carried on front and rear wheels and including a power source, a mower structure carried by the body between the front and rear wheels and including a frame, a first part pivoted to the frame on a longitudinal axis and a second part pivoted on the first part on a longitudinal axis, said parts being movable vertically with respect to the tractor and to each other, lifting and lowering means carried by the frame independently of the body and connected to the first part, lifting and lowering means carried by the frame independently of the body and connected to the second part, a rotatable drive member carried by the body on an axis substantially coaxial with the first longitudinal axis and connected to the tractor power source, and a second rotatable drive member carried by the mower on an axis substantially coaxial with the second longitudinal axis and connected to the first drive member.

11. For a tractor having a body carried on front and rear wheels, a frame carried by the body at a mid-portion thereof, said frame including a frame part below the body and a frame part extending upwardly from the body, a mower carried by the frame on the frame part below and independently of the body, said mower being mounted for vertical movement, a lift member on the mower including a guide, and lifting and lowering means for the mower carried by the frame at its second frame part, said means including a cable-winding member and a cable having one end connected to the second frame part, passing through the guide on the mower and having its other end connected to the cable-winding member.

12. For a tractor having a body carried on front and rear wheels, a mower carried by the body between the front and rear wheels and extending laterally at one side of the body for vertical movement, a support carried by the body and extending upwardly and laterally at the same side thereof as the mower, a guide member connected to the mower substantially vertically below said support, a guide member carried by the body, a cable-winding member carried by the body, and a cable secured at one end to the support and passing through the guide members and having its other end connected to the cable-winding member.

13. For a tractor having a body carried on front and rear wheels, a mower carried by the body between the front and rear wheels and including a first mower part having its grassward end disposed laterally at one side of the body, a second mower part having its inner end connected to the grassward end of the first part for movement about a vertical axis, releasable means normally holding the second part in operative position, the mower parts being movable vertically with respect to the tractor, a support on the body having a portion substantially vertically above the aforesaid pivot axis, a guide member carried by a mower part in the vicinity of the pivot axis, a guide member on the tractor, and a lifting means for the mower parts comprising a cable-winding member carried by the tractor and including a cable connected at one end to the aforesaid portion of the support and passing through the guide members and having its other end connected to the cable-winding member.

14. For a tractor having a body carried on front and rear wheels and having an intermediate housing portion, a U-shaped supporting frame detachably secured to and below said portion and having its legs upstanding at opposite sides of the body, an upwardly and rearwardly extending frame part secured to one leg of the frame, a cross member connecting said part and the other leg of the frame, a mower carried for vertical movement below the body by the intermediate portion of the frame independently of the body, and lifting and lowering means for the mower carried by the aforesaid frame part.

15. For a tractor having a body carried on front and rear wheels and having an intermediate housing portion, said tractor including a power source, a U-shaped supporting frame detachably secured to and below said portion and having its legs upstanding at opposite sides of the body, an upwardly and rearwardly extending frame part secured to one leg of the frame, a cross member connecting said part and the other leg of the frame, a second frame part connected at one end to the frame and having its other end disposed below the body, being secured intermediate its ends to the body, a mower carried for vertical movement below the body by the intermediate portion of the frame independently of the body and including cutting mechanism, lifting and lowering means for the mower carried by the aforesaid frame part, a drive member carried by the lower end of the second frame part and connected to the power source, and means connecting said member to the cutting mechanism.

16. In a mowing machine, a vehicle, a member carried by the vehicle for swinging movement in a vertical plane, a mower bar pivoted to the member for swinging movement relative thereto in a vertical plane, a guide carried by the bar, a second guide carried by the vehicle, and means for swinging the bar in a vertical plane including a cable-winding member on the vehicle and a cable having one end attached to said winding member, passing through the second guide and then around the first guide and having its other end anchored on the vehicle.

17. A tractor implement structure comprising a tractor having a front axle structure including spaced wheels, a rear axle structure including spaced wheels, said axle structures having a common longitudinal center line between the wheels, a longitudinal body carried at its front and rear ends respectively by said axle structures and offset laterally to one side of said center line, an implement frame structure connected to the tractor body at the other side of said center line and between the front and rear wheels at that side, said frame structure being generally confined in its lateral extent between the said side of the body and the said front and rear wheels, and an implement frame part extending laterally from the frame structure at that side of the tractor and laterally beyond said front and rear wheels.

18. A tractor implement comprising a tractor having longitudinally spaced front and rear axle structures, each having a pair of laterally spaced wheels, said axle structures having a common longitudinal center line, a longitudinal body carried by said structures and offset laterally to one side of said center line, an implement supporting frame connected to the tractor at the other side of the center line between the front and rear wheels at that side and including a part extending laterally beyond the wheels at that side, an implement part associated with the frame for movement with respect thereto, and actuating means for moving said implement part, said means including an operating element carried by the tractor for movement with respect thereto at the same side of the tractor as the supporting frame, means carried by the tractor at the same side for moving said element, and means at the same side and operatively connecting said element and the aforesaid movable implement part.

RAYMORE D. MacDONALD.
SAMUEL E. HILBLOM.

DISCLAIMER 2,249,633.—*Raymore D. MacDonald*, Western Springs, and *Samuel E. Hilblom*, Chicago, Ill. TRACTOR MOWER. Patent dated July 15, 1941. Disclaimer filed June 30, 1942, by the assignee, *International Harvester Company*.

Hereby enters this disclaimer to claims 4, 5, 6, 7, and 8 in said specification.

[*Official Gazette July 28, 1942.*]